G. J. ZOLNAY.
PROCESS OF MAKING ART MODELS, &c.
APPLICATION FILED DEC. 24, 1909.
968,505.
Patented Aug. 23, 1910.
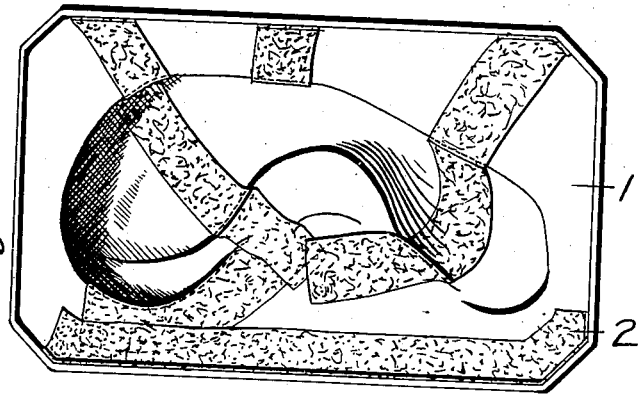
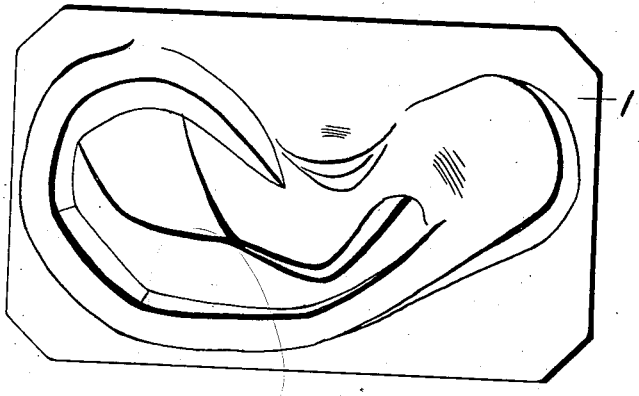

UNITED STATES PATENT OFFICE.

GEORGE JULIAN ZOLNAY, OF ST. LOUIS, MISSOURI, ASSIGNOR TO THE LEWIS PUBLISHING COMPANY, OF UNIVERSITY CITY, MISSOURI.

PROCESS OF MAKING ART MODELS, &c.

968,505. Specification of Letters Patent. Patented Aug. 23, 1910.

Application filed December 24, 1909. Serial No. 534,838.

*To all whom it may concern:*

Be it known that I, GEORGE JULIAN ZOLNAY, a citizen of the United States, residing at 4384 Maryland avenue, in the city of St. Louis and State of Missouri, have invented certain new and useful Improvements in Processes of Making Art Models, &c., of which the following is a specification.

This invention relates to the art of making reproductions of sculptural works, such as heretofore have been made of plaster of paris, and for use particularly in art and other schools, to facilitate teaching of modeling and drawing.

Objects such as statues, images, or the like, produced in accordance with the present invention are many times lighter than plaster molds, are easily capable of transportation in the mails without breakage, and are prepared in such a manner as to render them non-combustible, water-proof, and washable.

For a full understanding of the invention, reference is to be had to the following detail description and to the accompanying drawings, in which—

Figure 1 is a front view of a reproduction made in accordance with the invention, and Fig. 2 is a rear view thereof showing most clearly the manner of application of the reinforcing strips of asbestos.

Throughout the following description and on the several figures of the drawings similar parts are referred to by like reference characters.

Describing the invention specifically it is contemplated to practice the same in two different ways in the making of simple and complicated models or reproductions. The principle or process involved in carrying out the invention, is the same in both instances.

For reproducing simple art models it is contemplated to moisten several sheets of asbestos which are then pasted together by any suitable adhesive. A composite layer or body of material 1 is thus constituted, and is of a pliable or flexible nature. This moistened layer or leather-like sheet of substance is shaped over the original model, and of which a reproduction is being made, suitable modeling tools being employed to press the layer into all of the recesses of the original model. The above layer of asbestos is then permitted to dry while upon the model after which it is removed therefrom and saturated with a compound made of oxid of lead, gum, bees-wax, and gasolene, the latter rendering the molded article impervious, washable, and extraordinarily hard.

In practicing the invention with respect to more complicated models, the process consists in pressing about the article, the reproduction of which is being made, a thin layer of plastic substance obtained by mixing raw asbestos pulp, kaolin, whiting, or plaster of paris with dissolved glue, flour paste, and linseed oil, all in such proportions as to yield a paste of about the consistency of dough. The above plastic layer is then backed by strips 2 of sheet asbestos, adhesively applied thereto. The above product is then permitted to dry, and when dry it is saturated with heated paraffin, oxid of lead, and a suitable pigment by which it is rendered impervious, washable, and of the desired color. The strips 2 of asbestos, as will be noted on reference to Fig. 2 of the drawings, serve to reinforce and rigidify the body of the reproduction after it becomes hardened.

The use of asbestos as heretofore described is essential to the production of the desired results in the manufacture of composition of art models in accordance with the present invention. Asbestos, as is well known, affords great strength and toughness by reason of its fibrous nature, and at the same time, it is extremely light, answering the requirements in this respect. No method heretofore practiced, so far as is known, has resulted in producing articles of the nature of the present invention combining strength, plasticity and lightness. Asbestos is also particularly advantageous because when it is combined with the stiffening materials hereinbefore described, it produces a pliable, non-combustible plastic body which takes perfect impressions from the mold. The plastic layer of asbestos is quite thin, and it is necessary to strengthen the same with a layer of asbestos paper, the latter being advantageously employed not only because of its lightness but when moistened, it becomes so pliable that it can be pasted in every recess of the mold and this strengthening of the recesses is of prime importance, since the corner edges and delicate projections of various molded articles are most exposed to damage in handling. The stiffening or hardening materials used not only facilitate the production of a plastic article, yielding the desired impression from the mold, but said materials are the only ones that have been discovered which prevent the composition from sticking in the molds.

Articles or reproductions made in accordance with this invention are of unlimited durability, and their lightness, consistency and lasting qualities render them highly advantageous for use in teaching or drawing, modeling, and the arts in general.

Having thus described the invention, what is claimed as new is:

1. The process of making reproductions of models as hereinbefore set forth, consisting in placing upon an original model a layer of asbestos in moistened pliable condition, shaping said layer into the form of the original model by pressing the substance into the recesses of said mold by suitable tools, permitting the product to dry, and then saturating the dried product with a compound including oxid of lead, gum, beeswax, and gasolene.

2. The process of making reproductions of models, figures, or the like, and consisting in molding a thin layer of plastic substance including raw asbestos pulp, kaolin, whiting, flour paste, and linseed oil, about the original model, backing said layer with strips of asbestos sheets adhesively applied thereto, permitting the product to dry, and then rendering the product hard and impervious by a suitable compound.

In testimony whereof I affix my signature in presence of two witnesses.

GEORGE JULIAN ZOLNAY.

Witnesses:
 JOHN W. LEWIS,
 ANNA R. MARTIN.